United States Patent [19]

Phillips

[11] Patent Number: 4,558,534
[45] Date of Patent: Dec. 17, 1985

[54] PLANKTON SAMPLE TAKING APPARATUS

[75] Inventor: William H. Phillips, Saginaw, Mich.

[73] Assignee: Holgate Corporation, Saginaw, Mich.

[21] Appl. No.: 520,567

[22] Filed: Aug. 5, 1983

[51] Int. Cl.⁴ .............................................. A01K 73/00
[52] U.S. Cl. ................................................ 43/9; 43/4
[58] Field of Search ................ 43/4, 9; 285/332, 390, 285/242, 255

[56] References Cited

U.S. PATENT DOCUMENTS

| | | | |
|---|---|---|---|
| 1,867,281 | 7/1932 | Runkle | 43/9 |
| 2,294,637 | 9/1942 | Thomsen | 285/332 |
| 2,347,469 | 4/1944 | Dies | 285/332 |
| 2,435,820 | 2/1948 | Diggs | 285/332 |
| 3,955,835 | 5/1976 | Farrington | 285/332 |
| 4,089,131 | 5/1978 | Phillips | 43/4 |
| 4,212,335 | 7/1980 | Bova | 285/332 |
| 4,352,368 | 10/1982 | Landgarten | 285/332 |
| 4,451,070 | 5/1984 | Sauer | 285/242 |

Primary Examiner—Nicholas P. Godici
Assistant Examiner—Kurt Rowan
Attorney, Agent, or Firm—Learman & McCulloch

[57] ABSTRACT

Plankton sample taking apparatus comprises a net coupled to a container having an open mouth separably fitted into a coupling member. The adjacent parts of the container and the coupling member are nested and configured to form a wedging seal therebetween.

10 Claims, 4 Drawing Figures

U.S. Patent    Dec. 17, 1985    4,558,534
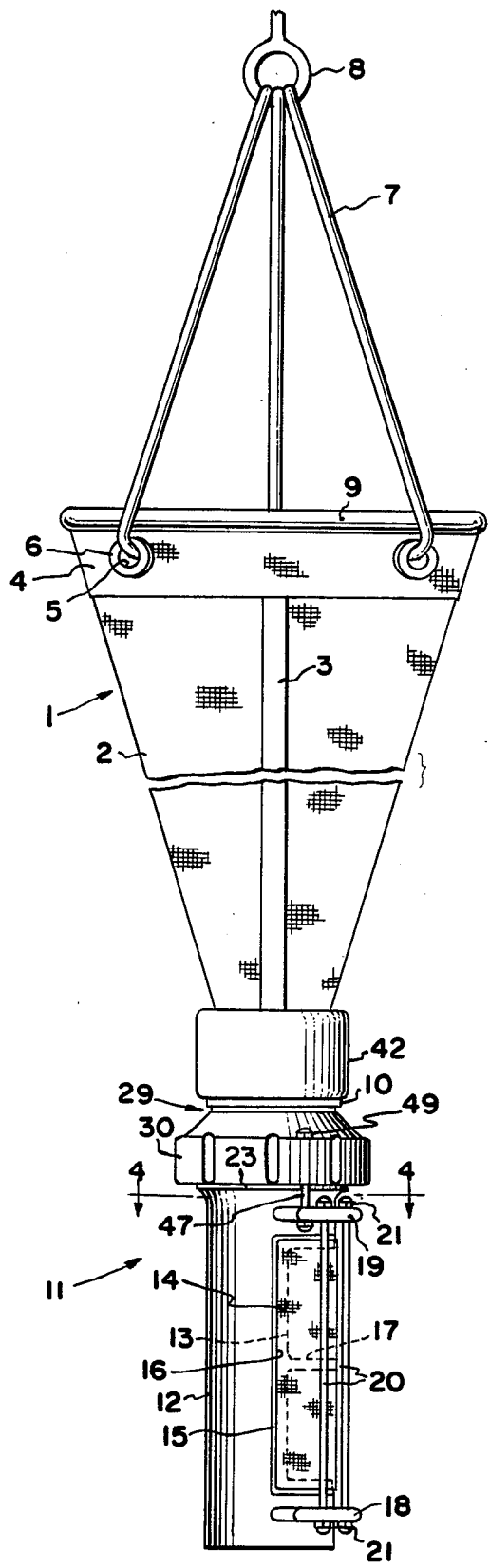
FIG.1
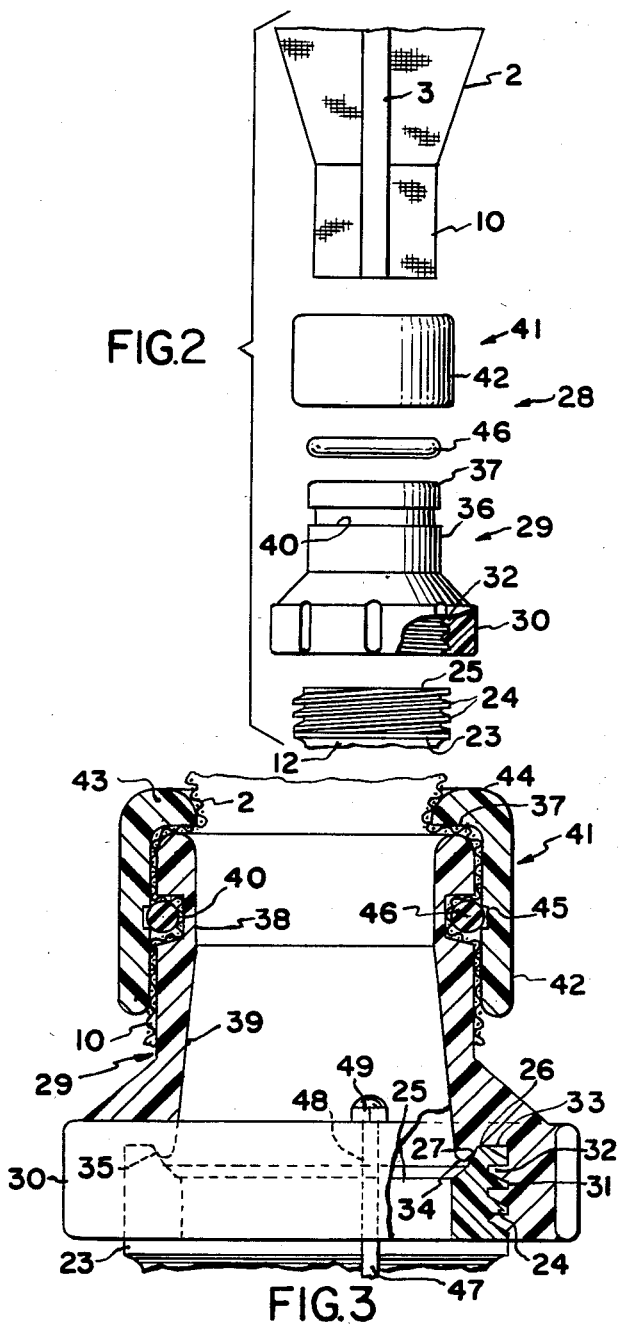
FIG.2
FIG.3
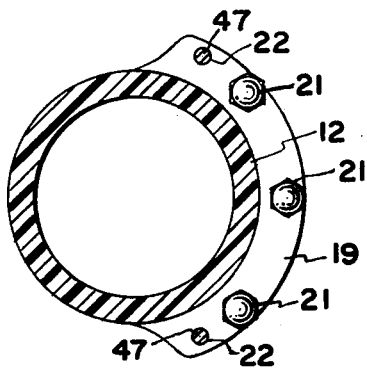
FIG.4

PLANKTON SAMPLE TAKING APPARATUS

In the taking of plankton samples from a body of water it is conventional to secure the smaller end of a conical net to the open end of a sample container and move the assembled net and container through the body of water. Apparatus of this kind is disclosed in Phillips U.S. Pat. No. 4,089,131. Although the apparatus disclosed in that patent is satisfactory, extensive use of such apparatus has revealed the desirability of improvements. For example, the patented apparatus uses a container having a relatively small neck. The passage of samples into and out of the container and cleaning of the latter are easier if the relatively small neck container is replaced by a wide-mouth container.

Although the apparatus disclosed in the Phillips patent is capable of effecting an excellent seal between the container and the coupling by means of which the container is coupled to the plankton net, it is possible for plankton to become wedged between the external surface of the container neck and the innermost part of the coupling. This possibility is increased in the event that the container and coupling are carelessly assembled or in the event that towing of the apparatus through a body of water causes relative rotation with consequent looseness between the container and the coupling. This problem can be solved by the provision of a sealing bead on the coupling which is accommodated in the mouth of the container and by providing a latch for preventing unintentional relative rotation between the container and the coupling.

When taking plankton samples with known sampling devices it is possible for plankton to become wedged between the gathering net and the coupling member in which the smaller end of the net is accommodated. Such plankton should not be part of the sample, but in disassembling the net, the container, and the coupling means, it is not uncommon for such plankton to become part of the sample. The qualitative and quantitative analyses performed on the sample, therefore, may be inaccurate.

Apparatus constructed in accordance with the invention solves all of the aforementioned difficulties.

SUMMARY OF THE INVENTION

Sample taking apparatus constructed in accordance with a preferred embodiment of the invention comprises a container closed at one end and terminating at its other end in a wide-mouth opening having a tapered lip. The container is coupled to the smaller diameter end of a conical gathering net by means of an assembly of telescoping members, one inner member of which is accommodated within the net and receives the mouth end of the container. This coupling member has a shoulder on which the lip of the container mouth may seat, and such shoulder is provided with an annular bead which projects into the mouth of the container. The bead and the lip are complementally tapered so as to provide a wedging seal between the container and the coupling member.

The assembly for coupling the net to the container also includes an outer annular member which overlies the inner coupling member so as to sandwich the net between the inner and outer coupling members. The outer coupling member has a flange at one end which overlies the inner coupling member and such flange is convex outwardly.

The container has an opening in its side covered with a fine mesh screen which permits water, but not plankton, to flow outwardly from the container. The screen is protected against damage by a plurality of bars carried by the container and overlying the screen.

DESCRIPTION OF THE DRAWINGS

The presently preferred embodiment of the invention is disclosed in the following description and in the accompanying drawings, wherein:

FIG. 1 is a side elevational view of a plankton sampler coupled to one end of a gathering net, the net being shown fragmentarily;

FIG. 2 is an exploded view, partly in section and partly in elevation;

FIG. 3 is an enlarged, sectional view illustrating the net and the coupling in assembled condition; and FIG. 4 is an enlarged sectional view taken on the line 4—4 of FIG. 1.

DETAILED DESCRIPTION

Apparatus constructed in accordance with the disclosed embodiment of the invention is adapted for use in conjunction with any one of a number of different kinds of conical sample gathering nets 1 having a tapering body 2 formed of nylon or other suitable netting material and equipped with axially extending reinforcing strips 3, as is conventional. At its larger diameter end the body 2 has a reinforcing band 4 of suitable material and is provided with openings 5, reinforced by suitable grommets 6, through which a towing bridle 7 passes. The bridle is connected to a ring 8 which may be attached to one end of a tow line. Preferably, a rigid hoop 9 is fitted at the larger diameter end of the body 2 so as to maintain that end of the body open. The smaller diameter end of the body 2 preferably includes a short, cylindrical neck portion or cod 10.

The net is adapted to be fitted to a container 11 which, in the disclosed embodiment, comprises a generally cylindrical body 12 open at one end. The body may be closed at its other end and provided with a substantially semicircular opening 13 in one side thereof. Alternatively, the body could have impervious sides and be open at its bottom. In any case, a suitable screen 14 of fine mesh material, such as nylon or stainless steel, overlies the opening 13 (or the bottom opening) and is secured in place by conventional means, such as adhesive or resilient retainers 15 which, together with the marginal edges of the screen 14, are accommodated in grooves 16 that encircle the opening 13. Preferably, the body 12 is provided with reinforcing bands 17 which underlie the screen 14. If the body is formed of a metallic material, the screen may be welded or soldered to the body.

In a preferred construction the body 12 is provided with arcuate, axially spaced ribs 18 and 19 that are spanned by protective rods 20 which overlie the screen 14. The rods are secured at their opposite ends by nuts 21. The upper rib 19 has at least one opening 22 therein for a purpose presently to be explained.

At the open end of the body 12 is a flange 23 provided with an external thread 24. The body has a mouth 25 from which extends a tapered lip 26 having an inclined radially inner surface 27 which slopes in a direction toward the open end of the container body. The cross sectional area of the mouth 25 of the body corresponds to the cross sectional area of the body at any point along its length.

Apparatus for coupling the net 1 to the container 11 is designated generally by the reference character 28 and comprises an inner, annular body 29 at one end of which is an enlarged flange 30 having a bore 31 formed with a thread 32 which corresponds to the thread 24 on the container body 12. The bore 31 terminates in an internal, radially extending shoulder 33 at the radially inner edge of which is an annular, tapered bead 34 which extends axially of the body 29 and is radially spaced from the bore 31 to form an annular groove. The bead 34 has an inclined radially outer surface 35 which confronts the surface 27 of the lip 26 and the lip and the bead are so located that the lip is accommodated in the groove between the lip and the skirt and nests with one lip with the surfaces 27 and 35 engaging engage one another with an interference sealing fit when the body 29 is screwed onto the container body 12.

The coupling body 29 also includes a generally cylindrical section 36 having an outer diameter corresponding substantially to that of the cod 10 of the net 1. The section 36 has a convex, smoothly rounded free end 37, and it also has a cylindrical bore 38 which merges with a tapered bore 39 that communicates with the bore 31. The section 36 of the coupling body 29 also has an external, annular groove 40 therein.

The coupling apparatus 28 also includes an outer anchor ring 41 having an annular skirt 42 of such diameter as to accommodate the cylindrical section 36 of the coupling body 29. The anchor ring 41 terminates at one end in an annular flange 43 which overlies the end 37 of the coupling body 29 and has an outwardly convex surface 44. The skirt 42 also has an annular groove 45 in its inner surface and at a height to confront the groove 40. A rubbery, deformable retaining ring 46 is adapted to be accommodated in the grooves 40 and 45.

To assemble the net 1 with the coupling apparatus 28, the cod 10 is threaded through the ring 41 and through the retaining ring 46. The cylindrical section 36 of the coupling body 29 then is fitted into the cod 10 of the net 1. The retaining ring 46 then may be stretched and moved into encircling relation with the cod 10 and the section 36. When the ring 46 reaches the groove 40 it will contract and wedge the adjacent portion of the cod 10 into the groove 40. Thereafter the anchor ring 41 may be slid longitudinally over the cod 10 and the section 36 until the flange 43 seats upon the free end 37 of the member 29 so as to compress the cod 10 between the surface 37 and the flange 43.

Movement of the anchor ring 41 toward its seated position will subject the retaining ring 46 to radially compressive force. The groove 40 has a width greater than the diameter of the ring 46, however, so compression of the ring 46 enables the latter to be deformed into the groove. When the groove 45 reaches the level of the ring 46, the latter will expand radially and occupy the groove 45, thereby providing a secure, but nevertheless releasable, coupling of the members 29 and 41 to one another. In these positions of the parts, that portion of the cod 10 which occupies the groove 40 will be securely retained therein so as to preclude inadvertent separation of the net from the coupling apparatus.

Following the assembly of the coupling apparatus and the net 1, the mouth of the container body 12 may be fitted into the threaded bore 31 of the coupling body 29 and the two parts relatively rotated so as to cause the lip 26 to enter the recess between the skirt and the bead 34 and move toward the shoulder 33. As the lip moves toward the shoulder, the lip surface 27 and the bead surface 35 will engage one another with a wedging action resulting in an interference fit seal between the lip and the bead, thereby precluding any likelihood of the admission of water or plankton radially outwardly of the lip.

Following attachment of the coupling body 29 to the container body 12, a latch pin 47 may be extended through the opening 22 in the rib 19 and through a corresponding opening 48 in the flange 30. The latch pin 47 is provided with retaining nuts 49 or the like at its opposite ends. The latch pin 47 positively precludes relative rotation between the members 12 and 29, thereby ensuring the preservation of the seal between the lip 26 and the bead 34 and the precluding any possibility of loss of the container 11.

The securing of the net 1 to the coupling apparatus 28 preferably occurs at the zone at which the cod 10 commences. This will enable the cod to negotiate the substantially right angular bend necessitated by the flange 43, but will not impose any significant stress on the juncture of the net and the cod as the assembled apparatus is drawn through a body of water.

To uncouple the net from the coupling apparatus 28, the anchor sleeve 41 may be slid upwardly from the position shown in FIG. 3 toward the position shown in FIG. 2, thereby exposing and permitting access to the ring 46, following which the ring and the cod 10 may be removed from the groove 40 in the coupling member 29.

The disclosed embodiment is representative of a presently preferred form of the invention, but is intended to be illustrative rather than definitive thereof. The invention is defined in the claims.

I claim:

1. In plankton sample taking apparatus having a container at one end of which is an externally threaded open mouth terminating at its free end in a lip, and an annular body member having at one end thereof an internally threaded skirt threadedly accommodating said one end of said container, the improvement comprising an annular bead carried by said body member radially inward of said skirt and spaced therefrom to form between said skirt and said bead an annular groove in which said lip is removably accommodated, said bead and said lip being tapered and having confronting, sloping surfaces in nesting engagement with one another and forming an interference fit seal therebetween; and an annular anchor member removably accommodating said body member, said anchor member having at one end thereof a radially inwardly projecting flange overlying the corresponding end of said body member.

2. Apparatus according to claim 1 wherein said lip is tapered in a direction toward said one end of said container.

3. Apparatus according to claim 2 wherein said lip is tapered on its radially inner surface only.

4. Apparatus according to claim 1 wherein said flange has an outwardly convex exterior surface and wherein said corresponding end of said body member is outwardly convex.

5. In sample taking apparatus having a container at one end of which is an externally threaded open mouth, a gathering device having a pliable cod at one end, an annular body member having a first section thereof fitted into said cod and a second section terminating in an internally threaded skirt threadedly accommodating the mouth of said container, an annular anchor member encircling said first section of said body member and that part of said cod thereon, and a retaining ring interposed between said first section of said body member and said part of said cod for retaining said first portion of said body member within said cod, the improvement comprising an annular, radially inwardly extending flange at one end of said anchor member overlying and bearing upon the corresponding end of said first portion of said body member with said cod sandwiched between said flanged and said end of said body member, said end of said body member being smoothly rounded and said flange having a smoothly arcuate convex outer surface.

6. Apparatus according to claim 5 wherein said mouth of said container has at its free end an annular lip and wherein said second section of said body has an annular bead radially inwardly spaced from said skirt and forming an annular groove in which said lip is accommodated.

7. Apparatus according to claim 6 wherein said bead and said lip have inclined surfaces in confronting engagement with one another and forming an interference fit seal.

8. Apparatus according to claim 6 wherein said container has an opening in its side, said opening being covered by a screen.

9. Apparatus according to claim 8 including a plurality of spaced apart, protective rods overlying said screen.

10. Apparatus according to claim 8 including projections carried by said container and protruding beyond said side of said container adjacent said opening, and spaced apart, protective rods secured to said projections and overlying said screen.

* * * * *